(12) United States Patent
Chiang

(10) Patent No.: US 6,317,279 B1
(45) Date of Patent: Nov. 13, 2001

(54) REVOLVING OPTICAL EYEPIECE AND THE ADJUSTING METHOD THEREOF

(76) Inventor: Chin-Hsi Chiang, 6, Alley 73, Lane 244, Hsin Shu Road, Hsin Chuang, Taipei 242 (TW)

( * ) Notice: Subject to any disclaimer, the term of this patent is extended or adjusted under 35 U.S.C. 154(b) by 0 days.

(21) Appl. No.: 09/696,216

(22) Filed: Oct. 26, 2000

(51) Int. Cl.[7] .................................................. G02B 7/02
(52) U.S. Cl. ............................................................ 359/822
(58) Field of Search .................................. 359/822, 694, 359/696, 643

(56) References Cited

U.S. PATENT DOCUMENTS

| | | | |
|---|---|---|---|
| 4,072,971 | * | 2/1978 | Kuboshima ............................ 396/84 |
| 5,867,310 | * | 2/1999 | Hasegawa ............................ 359/381 |
| 6,185,375 | * | 2/2001 | Mikiami ................................ 396/84 |

* cited by examiner

*Primary Examiner*—Ricky Mack
(74) *Attorney, Agent, or Firm*—Bacon & Thomas, PLLC

(57) ABSTRACT

The present invention relates to a revolving optical eyepiece and the adjusting method thereof. A prism, a plane mirror and mechanical transmission components are fitted between an objective set and an eyepiece assembly. When the eyepiece assembly turns for adjustment, the optical components will be driven in such a way that the beam reflected from the objective set is then refracted and reflected by the optical components. Thereafter, it will still be projected within the sight range of the eyepiece assembly. As a result, the sight line can still aim at an object if the eyepiece assembly is turned somewhere. Moreover, the sight line of the beam of the optical can be kept between the objective set and the eyepiece assembly.

9 Claims, 8 Drawing Sheets

REVOLVING OPTICAL EYEPIECE AND THE ADJUSTING METHOD THEREOF

BACKGROUND OF THE INVENTION

1. Field of the Invention

The present invention relates to a revolving optical eyepiece and the adjusting method thereof and, more particularly, to an apparatus which is combined with a prism, a plane mirror and mechanical components in order for the eyepiece assembly to be freely adjusted and rotated on a fixing shaft. In addition, the beam projected from the objective set can exactly and completely fall upon the eyepiece assembly. Accordingly, the user doesn't have to move himself for the direct observation with different angle. In addition, image deviation of the sight line between the observer and the object can be prevented.

2. Description of the Prior Art

The eyepiece assembly of the conventional optical instruments, like telescope, microscope and others, is almost a fixed type and can't be rotated. In other words, the optical axis of the line of sight projected to the eyepiece assembly is not movable. Recently, a device is developed in which the display is installed in the eyepiece assembly. The synchronic rotation of the display and the eyepiece assembly can reach the effect of different angle in observing objects. However, it has the following drawbacks:

1. The whole unit of the conventional optical instrument with fixed line of sight has to be moved in changing the angle of the beam in coming into the objective. It's very impractical in using.
2. With respect to the type that the display is installed inside of the eyepiece assembly, the signal has to be electronically processed while the image is created by means of the CRT— or LCD—system. As a result, the noise is increased and the resolution is lowered during the circuit processing.

SUMMARY OF THE INVENTION

It is a primary object of the present invention to provide a revolving optical eyepiece and the adjusting method thereof in which the optical components mechanically driven and controlled are interposed between an objective set and an eyepiece assembly. In adjusting the eyepiece assembly to turn on a shaft, the beam received and then projected by the objective set will effectively fall upon the eyepiece assembly. Moreover, the rotation and the movement of the eyepiece assembly won't influence the observation effect of the object.

It is a further object of the present invention to provide a revolving optical eyepiece and the adjusting method thereof in which the beam projected from the objective set is refracted and reflected by the optical components, like prism, plane mirror, etc. to the eyepiece assembly. Without the processing of the circuit, noise won't be created and the image quality can be improved.

BRIEF DESCRIPTION OF THE DRAWINGS

The accomplishment of this and other objects of the invention will become apparent from the following description and its accompanying drawings of which.

DETAILED DESCRIPTION OF THE PREFERRED EMBODIMENT

Figure 1:
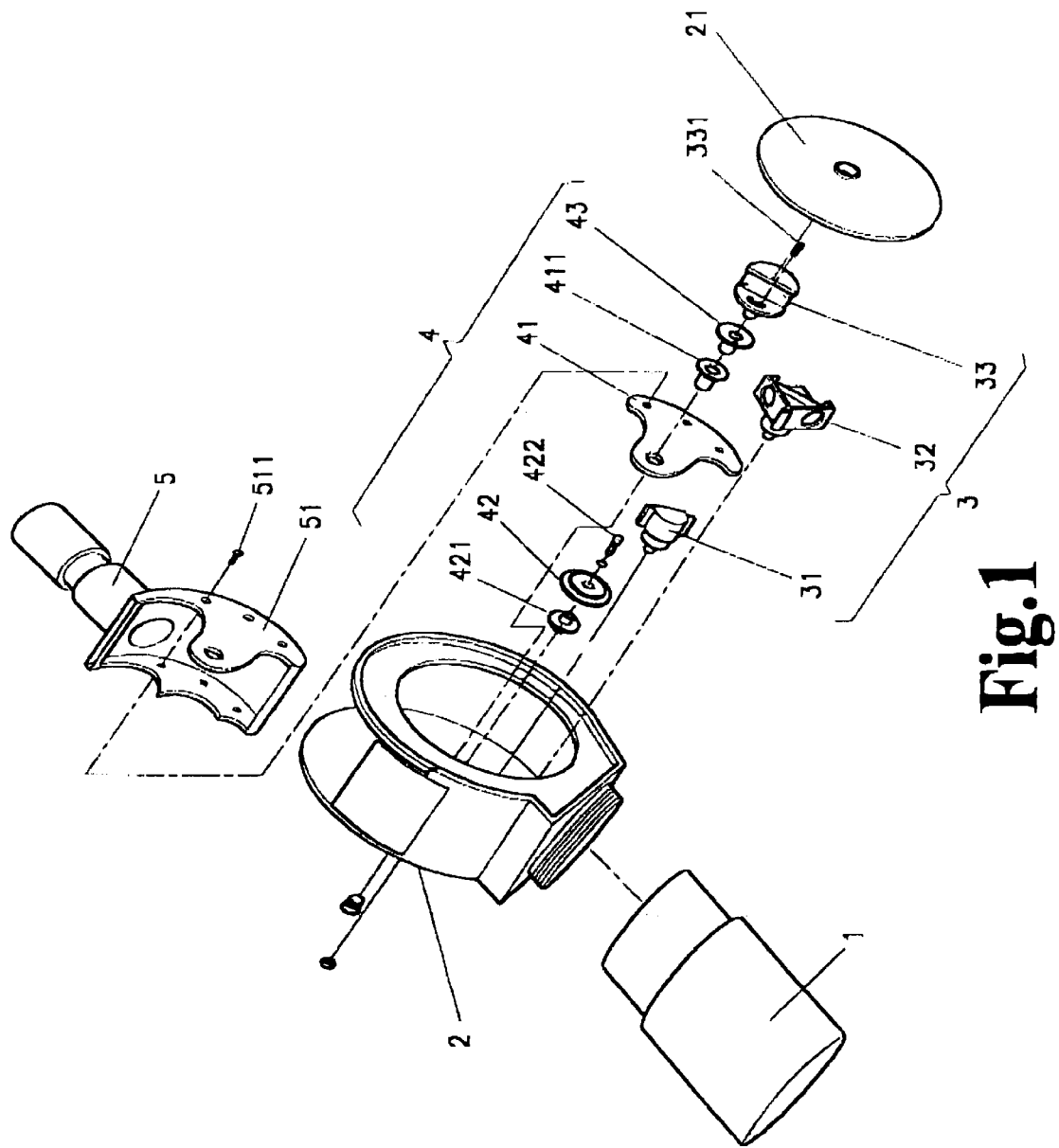
FIG. 1 is a perspective exploded view of a preferred embodiment of the present invention.
Figure 2:
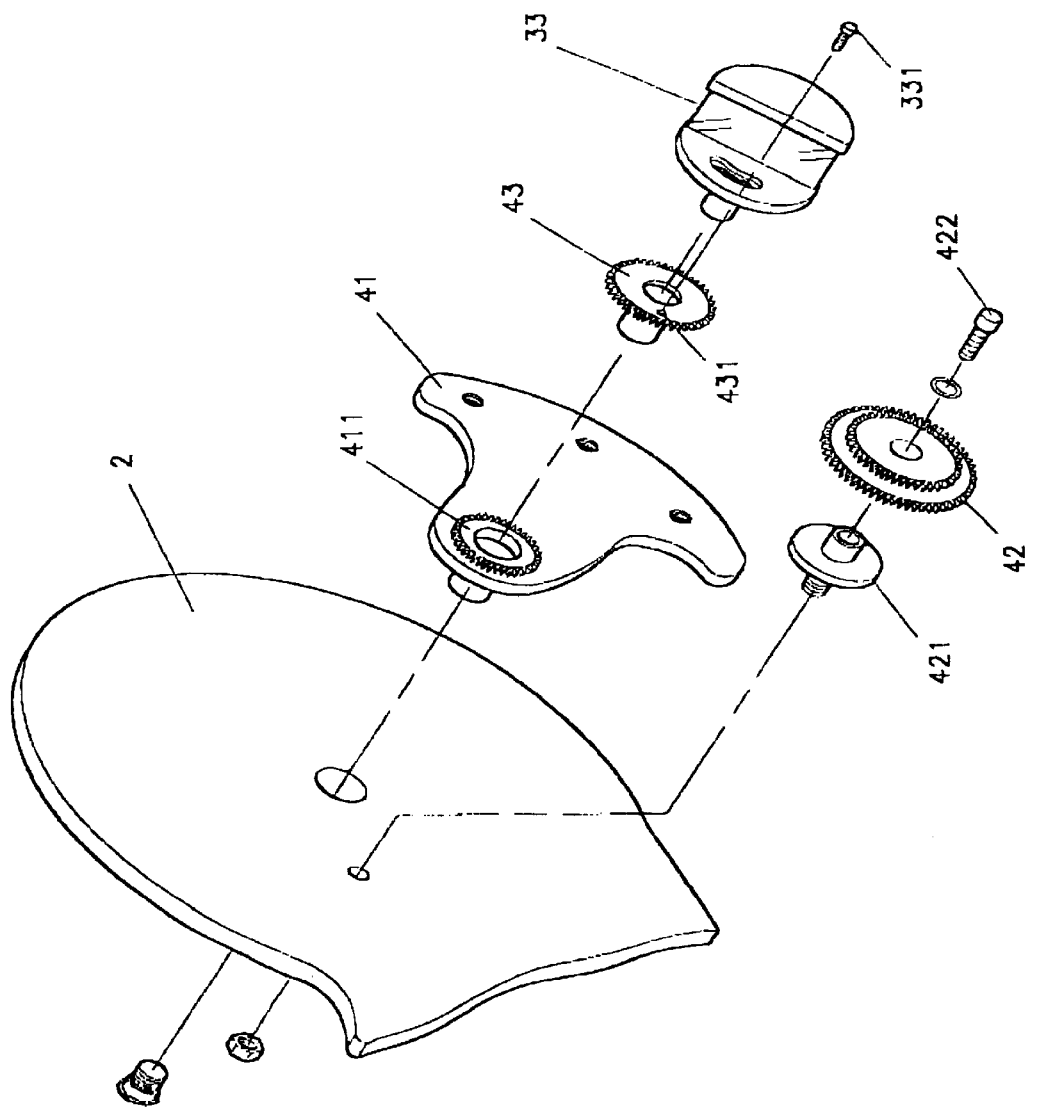
FIG. 2 is a perspective exploded view of the transmission parts of the preferred embodiment of the present invention.

FIG. 1 shows a perspective exploded view of a preferred embodiment of the present invention. It's apparent in FIG. 1 together with FIG. 2 that the revolving optical eyepiece and the adjusting method thereof includes at least an objective set 1, a housing 2, an optical component set 3, a drive mechanism 4 and an eyepiece assembly 5. The optical component set 3 contains a fixed reflector 31, a prism 32 and a revolving plane mirror 33. The drive mechanism 4 is provided with a driving gear 411 at a proper position of a revolving plate 41, a drive gear set 42 and a small driven gear 43 while the drive gear set 42 is composed of a large gear and a small gear.

In assembly, as shown in FIGS. 1 through 4, the objective set 1 is installed at one side of the housing 2. The prism 32 is disposed behind the objective set 1. The reflector 31 is mounted on the inner side wall of the housing 2 while the mounting position thereof enables the beam from the prism 32 to fall upon the plane mirror 33 after it is reflected by the reflector 31. The plane mirror 33 is installed on the driven gear 43 of the drive mechanism 4 while the eyepiece assembly 5 is disposed at the other side of the housing 2, and the pushing part 51 and the revolving plate 41 are screwed together. The drive gear set 42 is hinged with a pivot 421 which is fixed by means of a fixing screw 422 on the side wall of the housing 2. The driving gear 411 is engaged with the large gear of the drive gear set 42 while the driven gear 43 is engaged with the small gear of the drive gear set 42.

Figure 3:
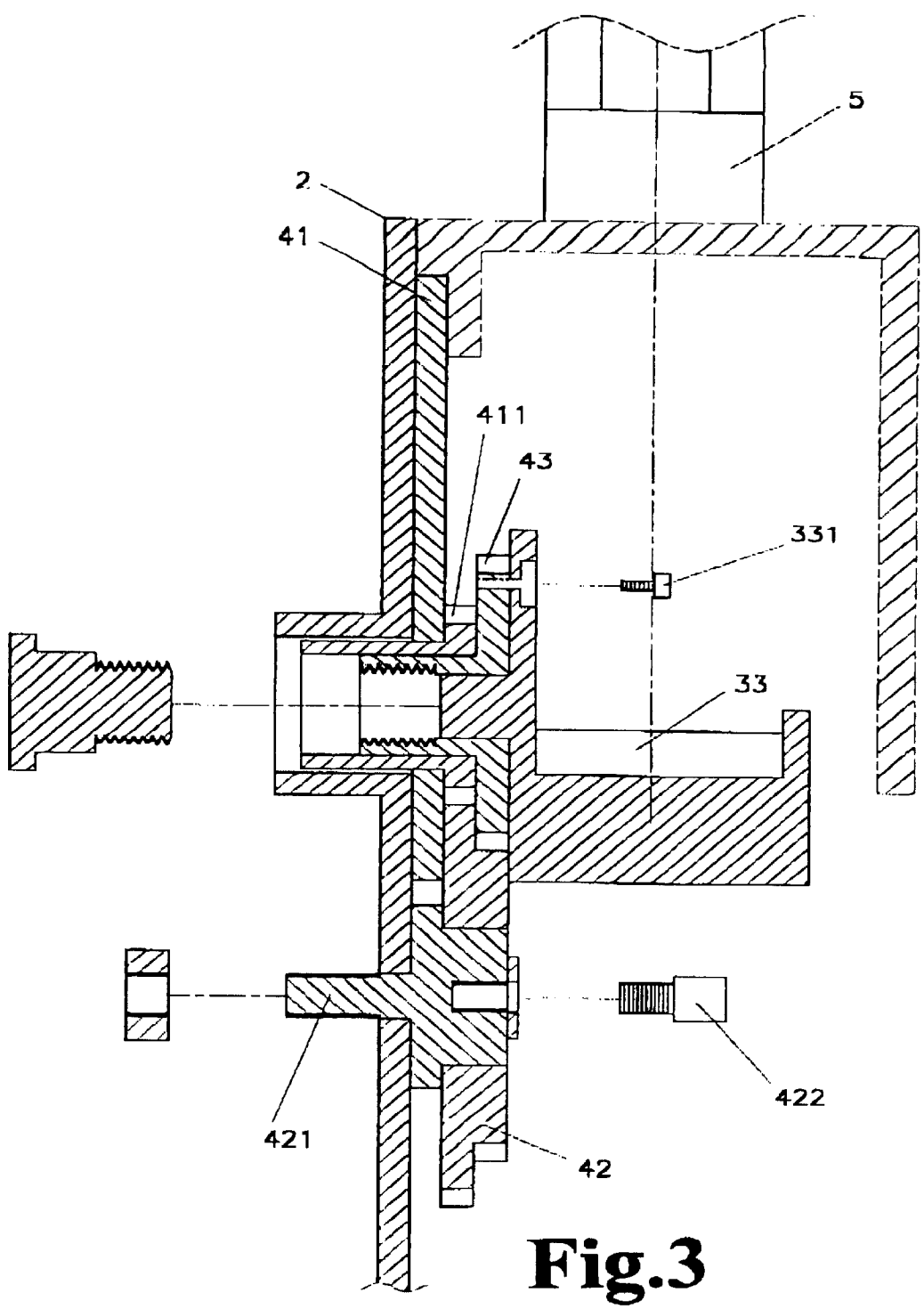
FIG. 3 is a sectional view of the transmission parts of the preferred assembled embodiment of the present invention.
Figure 4:
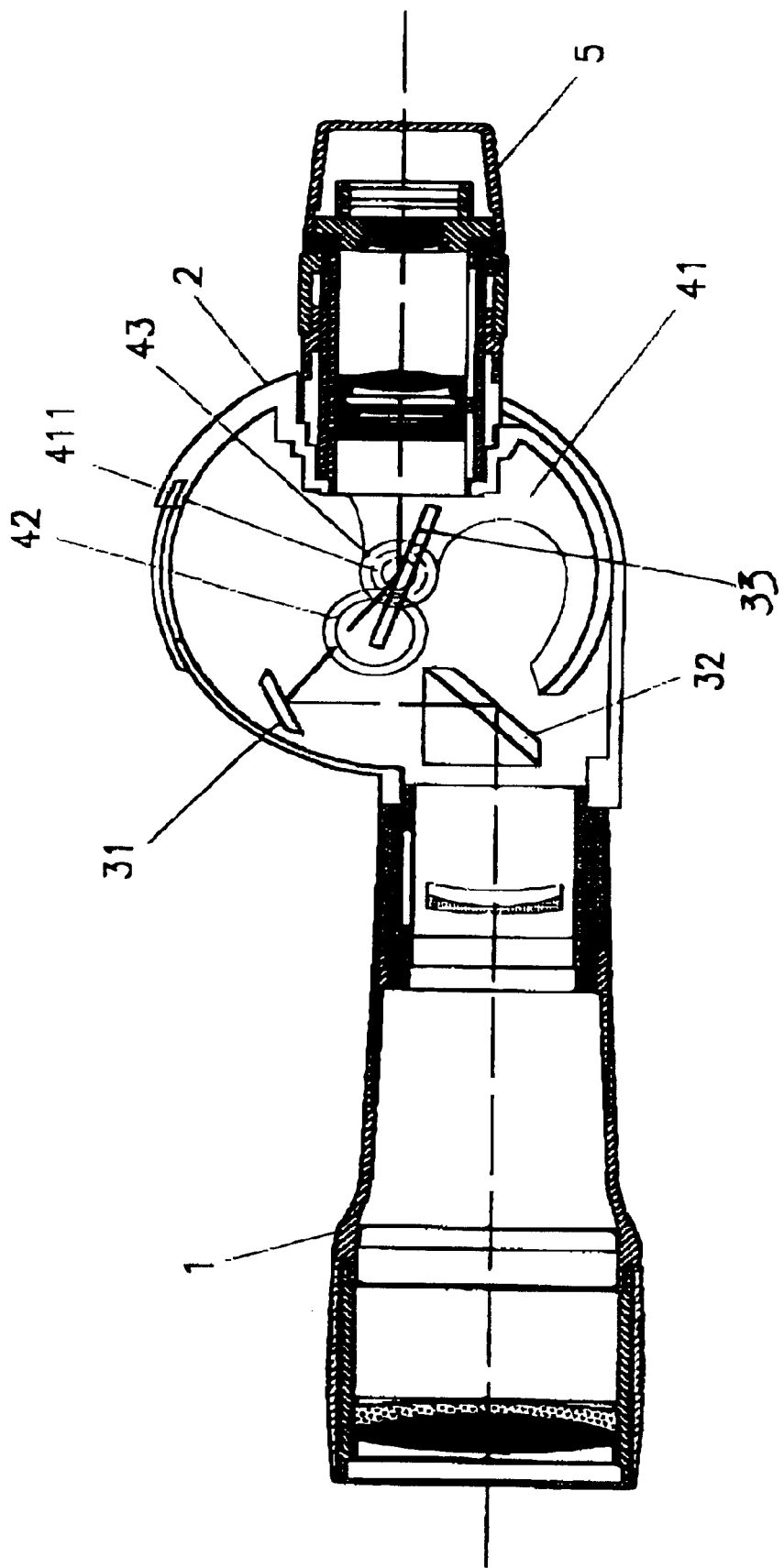
FIG. 4 is a first schematic drawing of the action of the preferred embodiment of the present invention.
Figure 5:
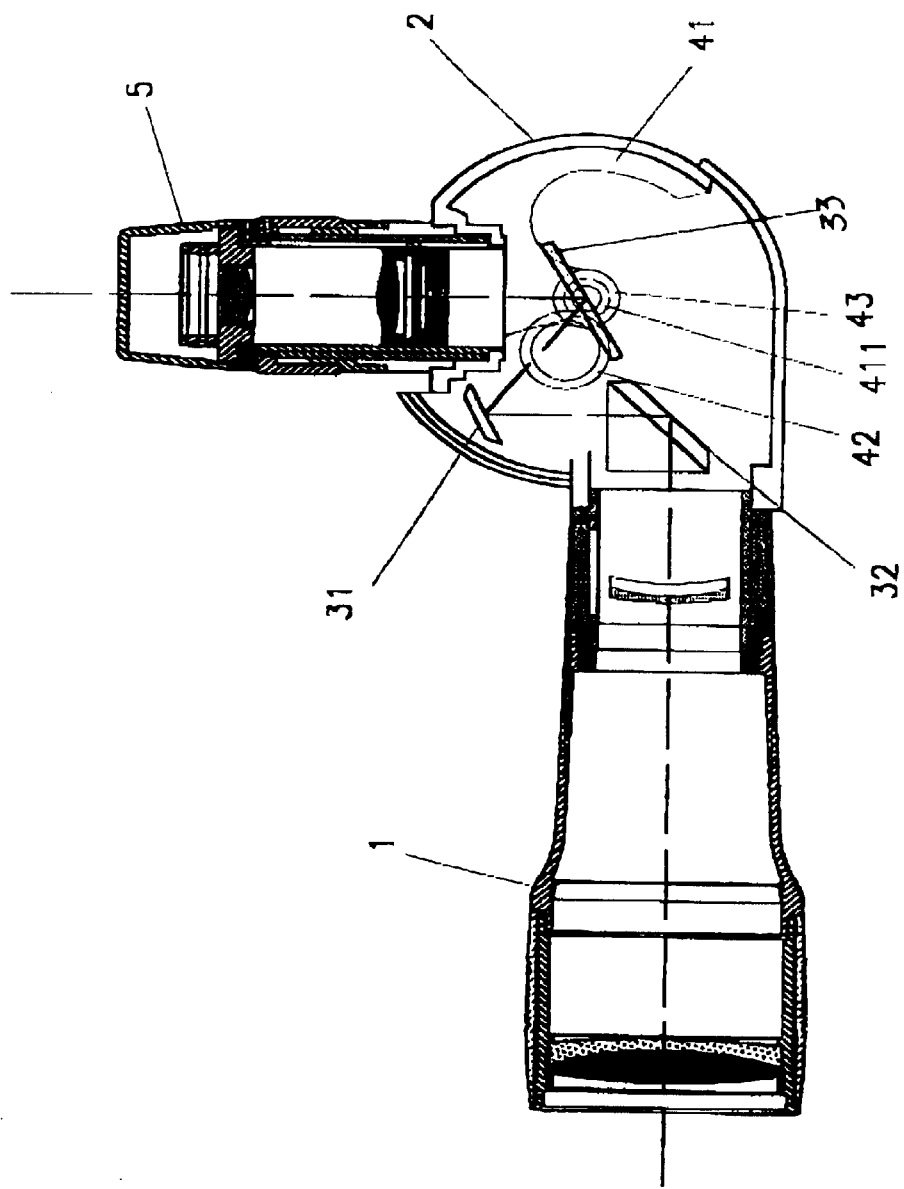
FIG. 5 is a second schematic drawing of the action of the preferred embodiment of the present invention.

FIG. 3 is a sectional view of the transmission parts of the preferred assembled embodiment of the present invention. The using ways of principles are apparent from FIG. 5 together with FIGS. 4 and 5. The emitting or reflective signal of the observed object is projected to the prism 32 after being collected by the objective set 1. After refraction, the beam is projected to the reflector 31. Thereafter, the beam is reflected to the plane mirror 33. Then, the beam of focal line is projected into the eyepiece assembly 5 after the reflection of the plane mirror 33 so that the user can use the eyepiece for observation.

When the position of the eyepiece assembly 5 is shifted (see FIG. 1 & FIG. 5), the revolving plate 41 will be moved by the pushing part 51. Accordingly, the driving gear 411 is brought into rotation for driving the drive gear set 42 while the driven gear 43 is set to make a differential rotation. Therefore, the plane mirror 33 makes a synchronic rotation with the driven gear 43. The rotational angle of the eyepiece assembly 5 and the rotational angle of the plane mirror 33 are kept in a proper proportion. When the eyepiece assembly turns by the Θ (degree), the plane mirror 33 turns by ½ θ (degree). The beam reflected by the reflector 31 and then by the plane mirror 33 is correctly projected on the eyepiece assembly 5 for the observation of the user.

Figure 6:
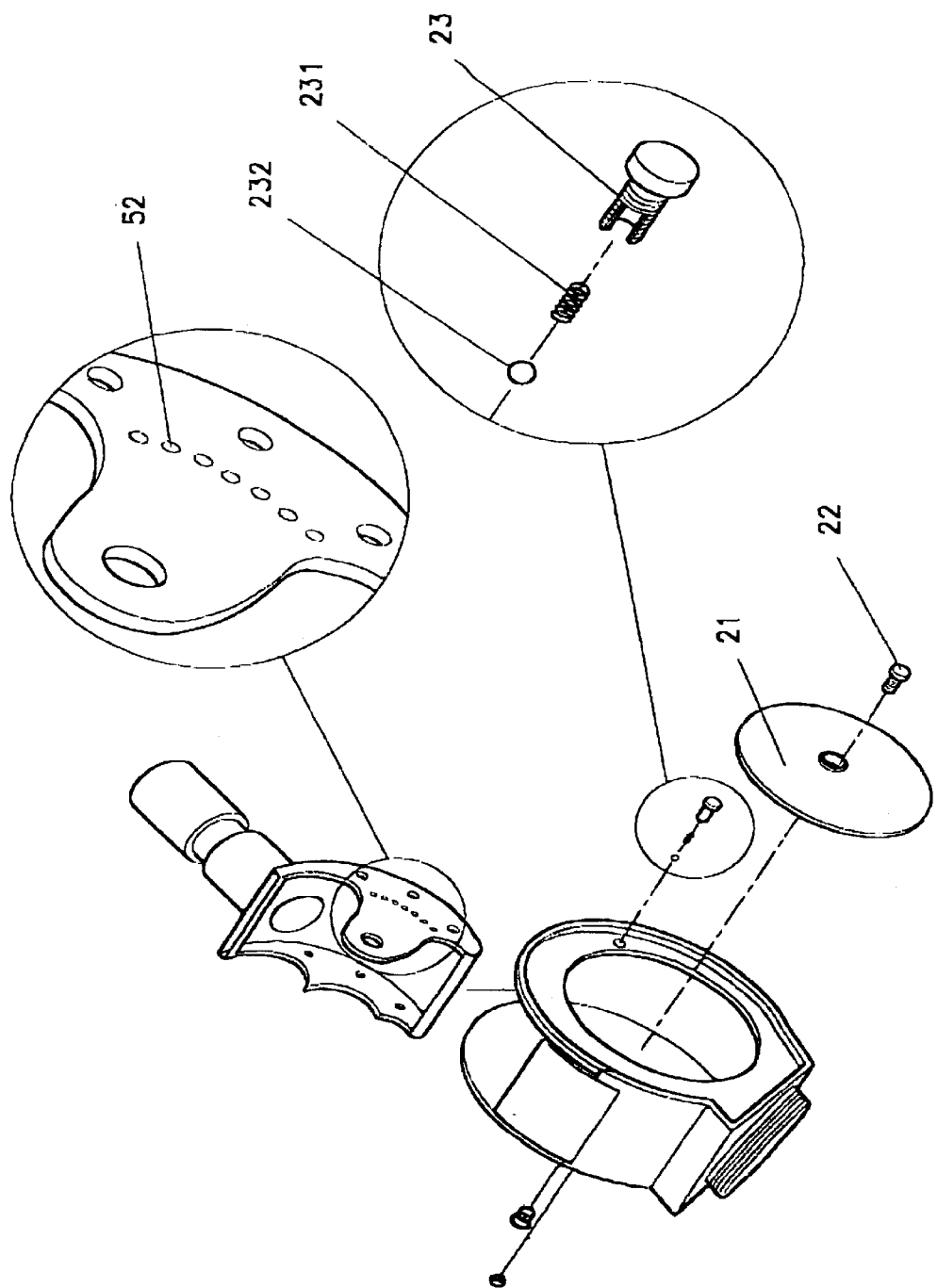
FIG. 6 is a partial perspective exploded view of another preferred embodiment of the present invention.

FIG. 6 shows a partial perspective exploded view of another preferred embodiment of the present invention. It's apparent from FIG. 6 that a fixing wheel 22 is disposed at a proper position of an external cover 21. In turning the eyepiece assembly 5, the fixing wheel 22 is loosened till a proper position and then is fixed. The pushing part 51 is fitted with a number of indented holes 52 on the side wall thereof while a hollow locating screw 23 is disposed at a corresponding position of one side of the housing 2. The screw 23 is fitted with a spring 231 and steel ball 232 at the hollow position thereof. When the eyepiece assembly 5 is turned, the steel ball 232 is separated from the indented hole 52 and compressed on the spring 231. When the eyepiece assembly 5 is adjusted to turn to a preset angle, the steel ball 232 will be positioned by means of the resilience of the spring 231 in the indented hole 52.

Figure 7:
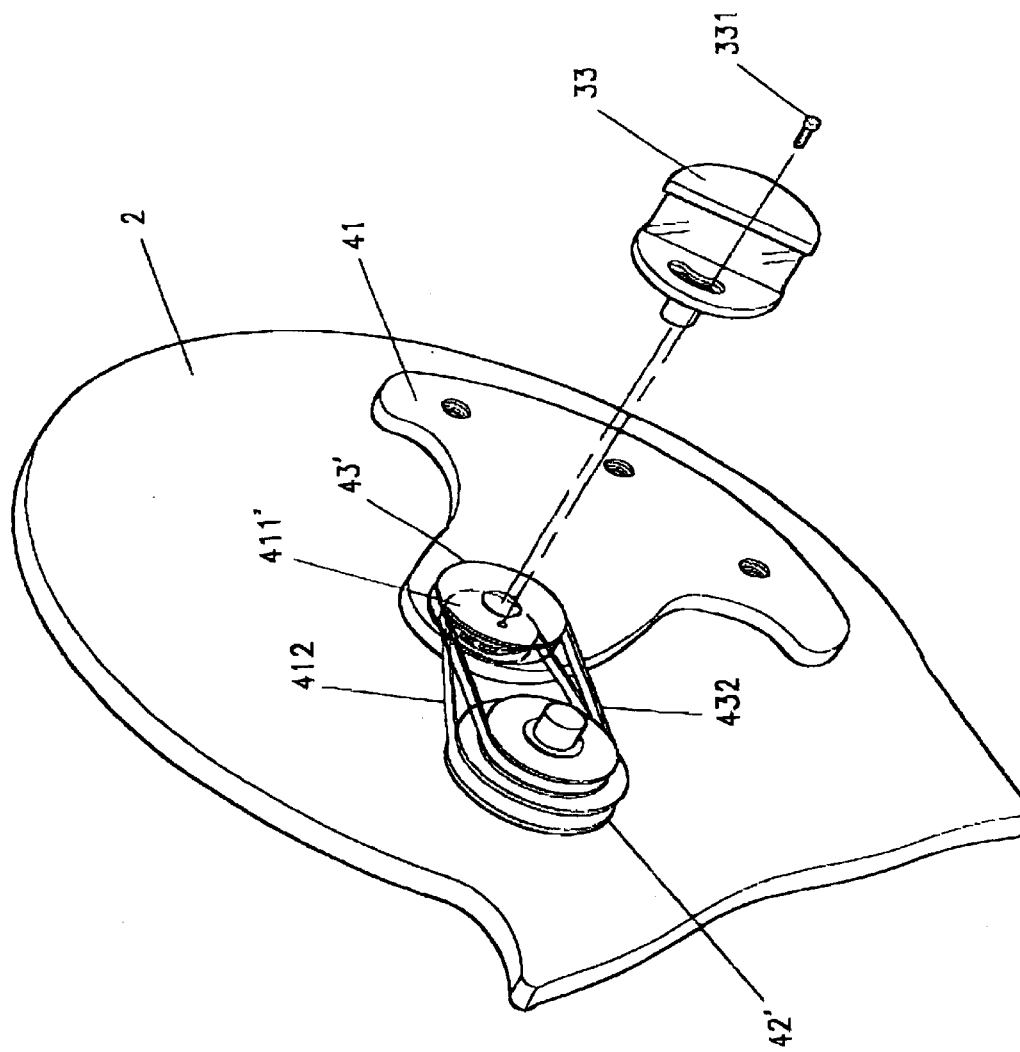
FIG. 7 is a perspective exploded view of the transmission parts of the preferred embodiment of the present invention.

FIG. 7 shows a perspective exploded view of the transmission parts of the preferred embodiment of the present invention. It's apparent from FIG. 7 that the drive mechanism 4 of the present invention can be made in a belt drive type. When the eyepiece assembly 5 turns, a drive belt pulley 411' is brought into rotation, while a drive belt pulley set 42' is driven by a belt 412 into rotation. As a result, another belt 432 is also brought into rotation to drive the driven pulley set 43'. The plane mirror 33 fixed thereon makes a differential rotation by means of the driven pulley set 43' in corresponding to the eyepiece assembly 5. Accordingly, the same effect as the gear transmission is attainable.

Figure 8A:
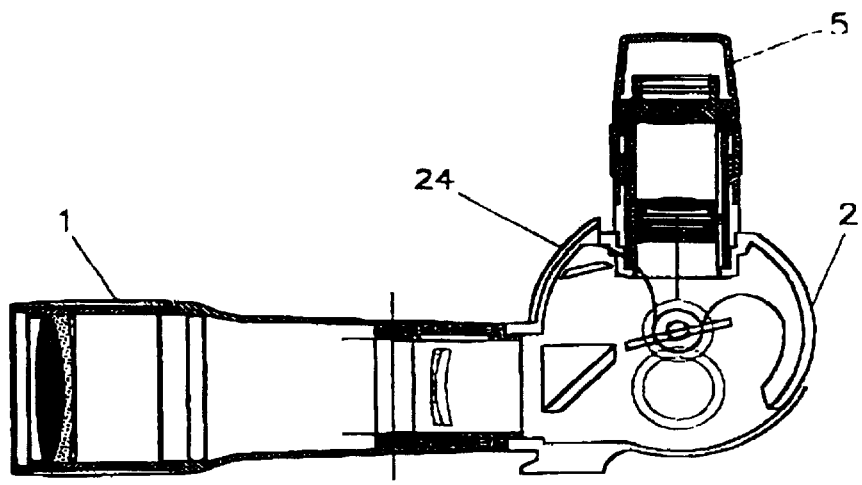
FIGS. 8A and 8B are first schematic drawings of the action of still another preferred embodiment of the present invention.
Figure 8B:
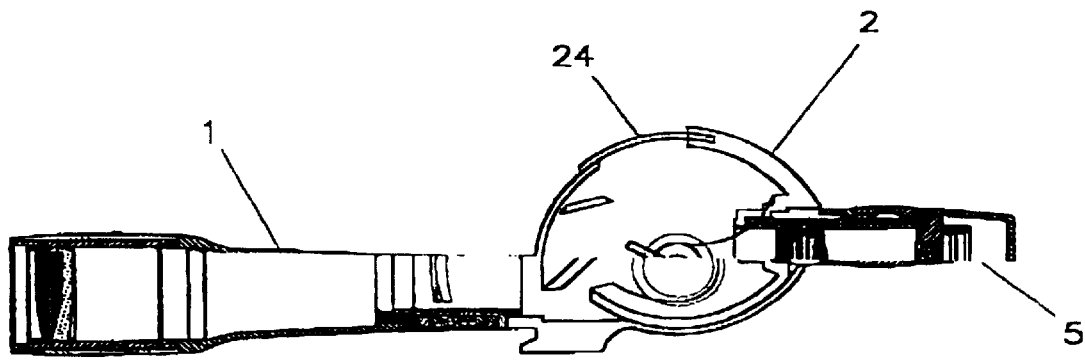

FIG. 8A is a first schematic drawing of the action of still another preferred embodiment of the present invention. It's apparent from FIG. 8A together with FIG. 8A that the housing 2 is provided with a foldable top cover 24 at top thereof so that it can be folded or unfolded when the eyepiece assembly 5 turns. Accordingly, the top of the housing 2 can be effectively covered in order to protect the components insides.

Furthermore, a further embodiment of the present invention makes use of a worm rod and a worm wheel (not shown) or the structure of a connecting rod in comparison to the drive belt pulley 411' and the drive belt pulley set 42' of the drive mechanism 4 of the previous embodiment of FIG. 7. Accordingly, it can not only reach a corresponding effect while a various transmission choices are attainable.

Many changes and modifications in the above-described embodiments of the invention can, of course, be carried out without departing from the scope thereof. Accordingly, to promote the progress in science and the useful arts, the invention is disclosed and is intended to be limited only by the scope of the appended claims.

What is claimed is:

1. A revolving optical eyepiece at least comprising:

an objective set, a housing, an optical component set having a fixed reflector, a prism and a revolving plane mirror, a drive mechanism set being provided with a driving gear at a proper position of a revolving plate, a drive gear set and a small driven gear while said drive gear set is composed of a large gear and a small gear; and an eyepiece assembly, wherein, in assembly, said objective set is installed at one side of said housing, and said prism is disposed behind said objective set, and said plane mirror is mounted on the inner side wall of said housing, is opposite to the prism and installed on said driven gear of said drive mechanism, and said eyepiece assembly is disposed at the other side of said housing, and said pushing part and revolving plate are screwed together, said drive gear set is hinged with a pivot which is fixed by means of a fixing screw on the side wall of said housing, and said driving gear is engaged with the large gear of said drive gear set while said driven gear is engaged with the small gear thereof; accordingly, when said eyepiece assembly turns, the gear sets will be brought into rotation while the revolving plane mirror turns by a proper angle with the revolving angle of said eyepiece assembly; as a result, the beam reflected from the revolving plane mirror is able to project upon said eyepiece assembly for the observation of the user.

2. A revolving optical eyepiece as claimed in claim 1, wherein the power transmission between said eyepiece assembly and said revolving plane mirror is carried out by means of a belt.

3. A revolving optical eyepiece as claimed in claim 1, wherein the power transmission between said eyepiece assembly and said revolving plane mirror is carried out by means of a worm rod and a worm wheel.

4. A revolving optical eyepiece as claimed in claim 1, wherein the power transmission between said eyepiece assembly and said revolving plane mirror is carried out by means of a connecting rod.

5. A revolving optical eyepiece as claimed in claim 1 or 2, wherein a fixing wheel is disposed at a proper position of an external cover; moreover, when said eyepiece assembly needs to be rotated, said fixing wheel is loosened till a proper position and then is fixed so that an adjustable observation angle of said eyepiece assembly is attainable.

6. A revolving optical eyepiece as claimed in claim 1, 2 or 3, wherein said pushing part is fitted with a number of indented holes on the side wall thereof while a hollow locating screw is disposed at a corresponding position of one side of said housing, and said screw is fitted with a spring and a steel ball at the hollow position thereof; when said eyepiece assembly is turned, said steel ball is separated from said indented hole and compressed on said spring; when said eyepiece assembly is adjusted to turn a preset angle, said steel ball will be positioned by means of the resilience of said spring in the indented hole.

7. A revolving optical eyepiece as claimed in claim 2, 3 or 4, wherein said housing is provided with a foldable top cover at top thereof so that it can be folded or unfolded when said eyepiece assembly turns; accordingly, the top of said housing can be effectively covered in order to protect the components insides.

8. An adjusting method of a revolving optical eyepiece, wherein said eyepiece assembly of an optical instrument is rotatable while refractive and reflective optical components are disposed behind an objective set, and said objective set receives and collects the beam which is refracted and reflected and then projected upon a revolving plane mirror, and wherein the revolving movement of said plane mirror is driven by said eyepiece assembly and controlled by the mechanical transmission, and when the optical components of said plane mirror and said eyepiece assembly make a differential rotation, a certain preset differential speed is kept in order for the reflected beam to project completely onto the eyepiece assembly.

9. An adjusting method of a revolving optical eyepiece as claimed in claim 8, wherein, when said eyepiece assembly is adjusted, a preferable preset differential rotation speed between said eyepiece assembly and said plane mirror is made in such a way that the eyepiece assembly is turned by θ-angle, so that the reflected beam is able to completely projected on said eyepiece assembly.

* * * * *